(12) United States Patent
Dunn

(10) Patent No.: US 8,150,057 B2
(45) Date of Patent: Apr. 3, 2012

(54) COMPANION MICROPHONE SYSTEM AND METHOD

(75) Inventor: William Frank Dunn, Austin, TX (US)

(73) Assignee: Etymotic Research, Inc., Elk Grove Village, IL (US)

( * ) Notice: Subject to any disclaimer, the term of this patent is extended or adjusted under 35 U.S.C. 154(b) by 616 days.

(21) Appl. No.: 12/347,508

(22) Filed: Dec. 31, 2008

(65) Prior Publication Data

US 2010/0166209 A1 Jul. 1, 2010

(51) Int. Cl.
*H04B 3/00* (2006.01)
(52) U.S. Cl. .......... 381/77; 381/312; 381/314; 381/315; 381/317; 445/41.1; 445/90.3
(58) Field of Classification Search .................... 381/77, 381/312–317, 322; 371/310, 322; 370/260, 370/280, 338; 445/41.1, 41.3, 90.3
See application file for complete search history.

(56) References Cited

U.S. PATENT DOCUMENTS

| | | | |
|---|---|---|---|
| 4,837,833 A | 6/1989 | Madaffari |
| 5,287,547 A | 2/1994 | Hidaka |
| 5,410,608 A | 4/1995 | Lucey et al. |
| 5,724,433 A | 3/1998 | Engebretson et al. |
| 5,727,070 A | 3/1998 | Coninx |
| 5,825,897 A | 10/1998 | Andrea et al. |
| 5,966,639 A | 10/1999 | Goldberg et al. |
| 5,995,599 A | 11/1999 | Dunn et al. |
| 6,031,922 A | 2/2000 | Tibbetts |
| 6,134,334 A | 10/2000 | Killion et al. |
| 6,424,721 B1 | 7/2002 | Hohn |
| 6,529,606 B1 | 3/2003 | Jackson et al. |
| 6,704,423 B2 | 3/2004 | Anderson et al. |
| 6,707,920 B2 | 3/2004 | Miller |
| 6,798,890 B2 | 9/2004 | Killion et al. |
| 6,813,490 B1 | 11/2004 | Lang et al. |
| 6,831,987 B2 | 12/2004 | Killion et al. |
| 6,912,501 B2 | 6/2005 | Vaudrey et al. |
| 6,937,738 B2 | 8/2005 | Armstrong |
| 7,065,224 B2 | 6/2006 | Cornelius et al. |
| 7,068,797 B2 | 6/2006 | Isberg et al. |
| 7,072,482 B2 | 7/2006 | Van Doorn et al. |

(Continued)

FOREIGN PATENT DOCUMENTS

EP 0 457 492 11/1991

(Continued)

OTHER PUBLICATIONS

Supplementary European Search Report corresponding to European Patent Application No. 05724953, completed Jan. 12, 2010.

(Continued)

*Primary Examiner* — Dung A. Le (74) *Attorney, Agent, or Firm* — McAndrews, Held & Malloy, Ltd.

(57) ABSTRACT

Systems and methods for wireless communication can include a first unit configured to synchronously transmit a first digital audio packet redundantly in at least a first dedicated slot and a second dedicated slot over a time period, and a second unit configured to receive wireless transmissions from the first unit. In certain embodiments, the second unit does not listen for a transmission in the second dedicated slot if the first digital audio packet is received in the first dedicated slot. In certain embodiments, the units are encoded with a group code that identifies group members, such that the units only receive data packets transmitted by group members with the same group code.

25 Claims, 8 Drawing Sheets

U.S. PATENT DOCUMENTS

| | | | |
|---|---|---|---|
| 7,076,076 | B2 | 7/2006 | Bauman |
| 7,110,562 | B1 | 9/2006 | Feeley et al. |
| 7,136,497 | B2 | 11/2006 | McSwiggen |
| 7,245,733 | B2 | 7/2007 | Saltykov |
| 7,248,711 | B2 | 7/2007 | Allegro et al. |
| 7,292,876 | B2 | 11/2007 | Bosch et al. |
| 7,313,246 | B2 | 12/2007 | Miller et al. |
| 7,369,669 | B2 | 5/2008 | Hagen et al. |
| 7,460,677 | B1 | 12/2008 | Soede et al. |
| 7,492,914 | B2 | 2/2009 | Arvidsson |
| 7,551,894 | B2 | 6/2009 | Gerber et al. |
| 2002/0039424 | A1 | 4/2002 | Watanuki |
| 2002/0068610 | A1 | 6/2002 | Anvekar et al. |
| 2002/0072816 | A1 | 6/2002 | Shdema et al. |
| 2002/0172162 | A1* | 11/2002 | Goodings ............. 370/280 |
| 2003/0045283 | A1 | 3/2003 | Hagedoorn |
| 2003/0223604 | A1 | 12/2003 | Nakagawa |
| 2004/0247138 | A1 | 12/2004 | Wang |
| 2005/0195996 | A1 | 9/2005 | Dunn et al. |
| 2010/0054508 | A1* | 3/2010 | Yang ..................... 381/310 |

FOREIGN PATENT DOCUMENTS

| | | |
|---|---|---|
| EP | 1 377 118 | 1/2004 |
| WO | 00/52959 | 9/2000 |
| WO | WO 00/70811 | 11/2000 |
| WO | 01/52597 | 7/2001 |
| WO | 2004/093490 | 10/2004 |
| WO | WO 2004/110099 | 12/2004 |

OTHER PUBLICATIONS

Bluetooth Audio/Video Working Group: "Audio/Video Remote Control Profile V1.0." Internet Citation, May 22, 2003, Retrieved from the Internet: hppt://www.bluetooth.com/NR/rdonlyres/OCD6930C-302E-4BB8-ACA8-199066B47ADE/922/AVRCPSpecv10.pdf, XP002412760.

International Search Report and Written Opinion for International Patent Application No. PCT/US2009/069831, dated Jul. 2, 2010.

Sanz, Roberto, et al., "Performance of Concatenated Channel Coding Schemes with Block Repetition for a Wireless Indoor High Bit Rate Flexible Modem," IEEE, 2001.

* cited by examiner

COMPANION MICROPHONE SYSTEM AND METHOD

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

Hearing-impaired people often have difficulty comprehending speech in noisy and/or reverberant environments such as encountered at parties or in a restaurant. The hearing-impaired person may have difficulty comprehending the speech of the talkers due to: 1) a hearing aid that may not adequately correct for the loss of hearing sensitivity to quiet sounds, or 2) a residual hearing acuity that is inadequate to permit that person to understand speech in the presence of noise levels that normal-hearing individuals find acceptable for carrying on a conversation. The first problem, lack of adequate audibility at some frequencies, can often be corrected with readjustment or change in the hearing aid circuit. The second problem, lack of adequate acuity, cannot be corrected with any known circuit. More specifically, those with normal hearing can carry on a conversation at a signal-to-noise ratio (SNR) of 0 to −5 dB, meaning the noise may be as much as 5 dB more intense than the desired speech signal. Individuals with moderate-to-severe hearing loss, on the other hand, may often require an SNR of +5 to +10 dB, 10 dB greater than those with normal hearing. The impossibility of a circuit solution to the problem is seen, for example, by the fact that no circuit can know which of many voices at a party is noise and which is considered signal. It is well known that a listener can switch his or her attention at will from one talker to another at a noisy party, often while continuing to look at the original uninteresting talker.

The SNR problem has been most obvious with children having severe-to-profound hearing loss. Such children find it impossible to properly understand the teacher even when they wear the best conventional hearing aids in a typical classroom. The use of FM systems such as those from manufacturers like Telex of Minnesota and others has provided a substantially improved SNR for such children, permitting them to learn and understand speech in classroom settings.

In FM systems, the teacher's voice (or other audio signal, perhaps from a video tape or audio recording) is used to frequency modulate a radio frequency carrier which is transmitted within the classroom. The students are then equipped with FM receivers. The FM receivers pick up the transmitted signal, demodulate it, and present received audio either to the students' hearing aids or to their ears via headphones or earphones. In this particular example, there is one audio signal, which is transmitted, that being the teacher's voice.

A severely hearing-impaired adult at a restaurant may face a similar difficulty with respect to noise, but now at least three talkers (assuming the case where two couples go out to eat) need to be heard. Passing a single microphone around is sometimes done as an effective, but inconvenient, solution. Similarly, head-worn hearing aids including FM receivers used with single-microphone FM transmitters are increasingly being used. One such system is manufactured by AVR Communications in Israel.

What is clearly needed, however, is a convenient multiple-microphone pickup system where each microphone operates in a wireless mode. Such a system would serve both those with hearing impairment and normally-hearing individuals, allowing both to communicate in difficult situations and environments. Such systems can be made small enough to also be used by individuals who wish to communicate discreetly with their undercover teammates.

Methods and systems for enhancing speech intelligibility using wireless communication in portable, battery-powered and entirely user-supportable devices are described, for example, in U.S. Patent Application Publication No. 2005/0195996, published Sep. 8, 2005 by Dunn et al. Nonetheless, improved systems that provide improved performance are desirable.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Certain embodiments of the present technology provide systems and methods for wireless communication. In certain embodiments, for example, a system for wireless communication includes: a first unit configured to synchronously transmit a first digital audio packet redundantly in at least a first dedicated slot and a second dedicated slot over a time period, and a second unit configured to receive wireless transmissions from the first unit. In certain embodiments, for example, the second unit does not listen for a transmission in the second dedicated slot if the first digital audio packet is received in the first dedicated slot. In certain embodiments, for example, the units are encoded with a group code that identifies group members, such that the units only receive data packets transmitted by group members with the same group code.

DETAILED DESCRIPTION

In the figures, like elements are indicated with like identifiers.

Certain embodiments of the present technology can allow a plurality of users to transmit and receive audio information wirelessly. Certain embodiments can allow any number of users to receive the audio information wirelessly. The present technology could be used when speaking to a group that includes hearing impaired individuals. The present technology could also be used when a group of speaking individuals includes hearing impaired individuals.

The systems and methods for wireless communication described herein can include transmit only units, transmit/receive units and receive only units. Transmit only units can transmit sound received at the unit as a digital audio packet. Receive only units can receive digital audio packets from transmit units. Transmit/receive units can transmit sound received at the unit as a digital audio packet and receive digital audio packets from other transmit units.

Figure 1:
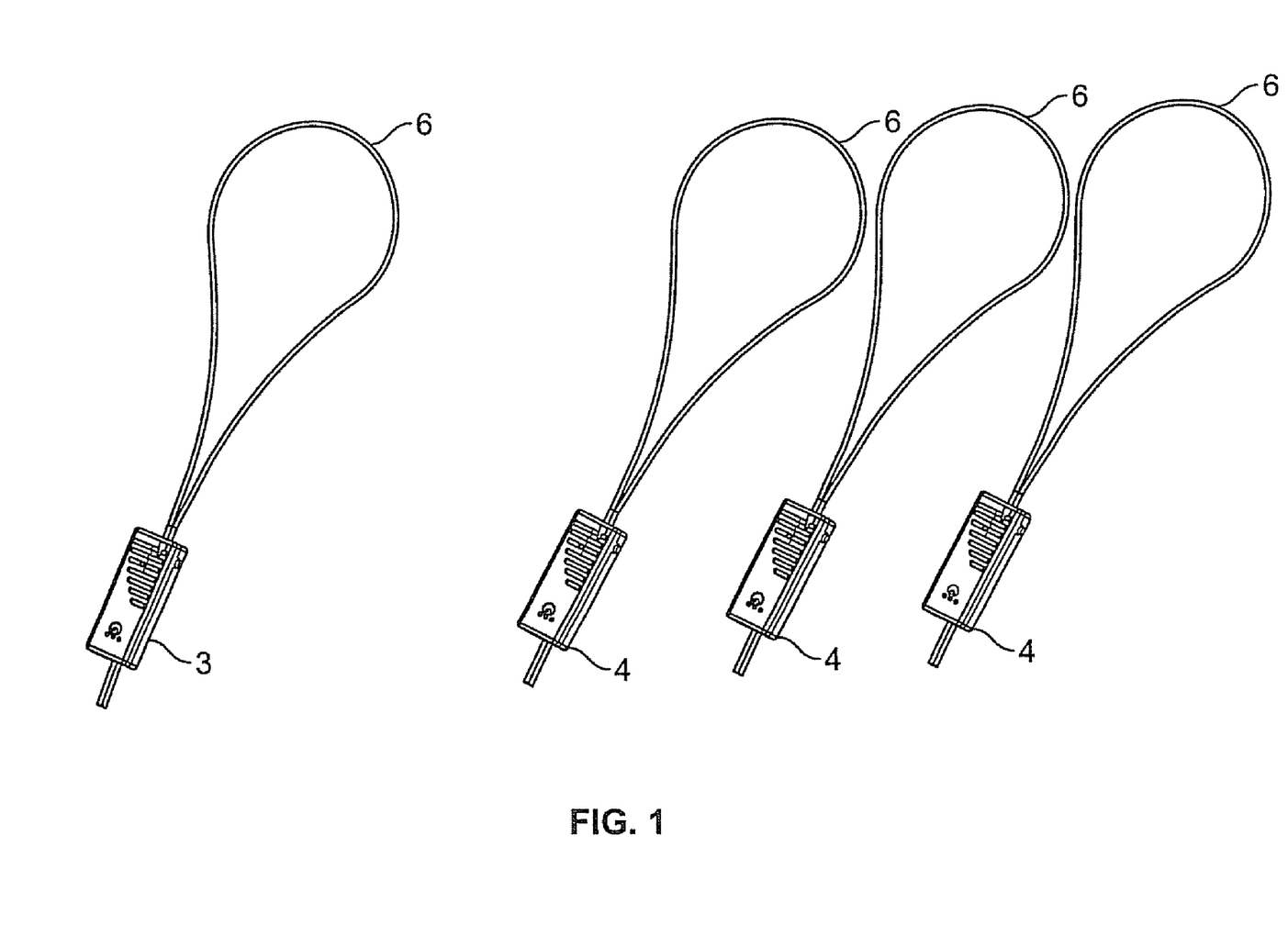
FIG. 1 illustrates exemplary transmit and receive units, in accordance with an embodiment of the present technology.
Figure 2:
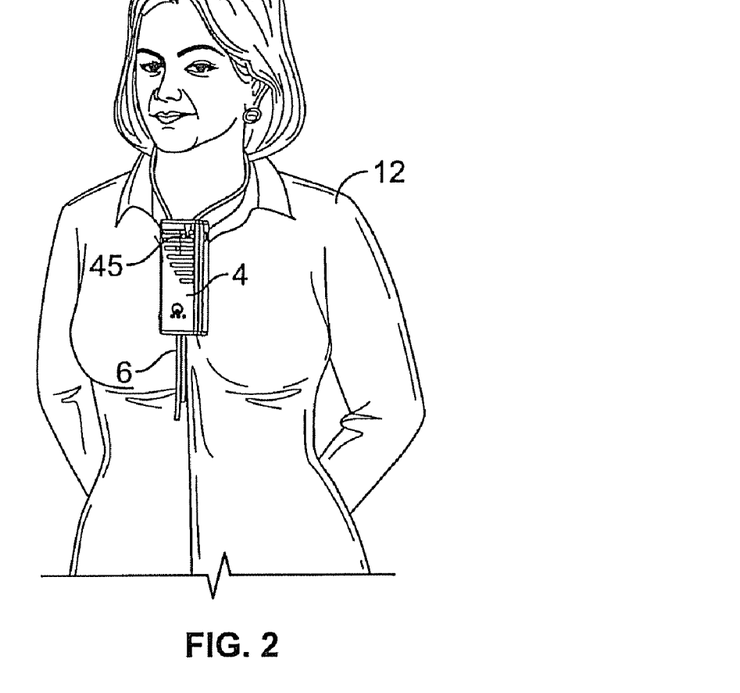
FIG. 2 illustrates a transmit unit supported around the neck of a user, in accordance with an embodiment of the present technology.
Figure 3:
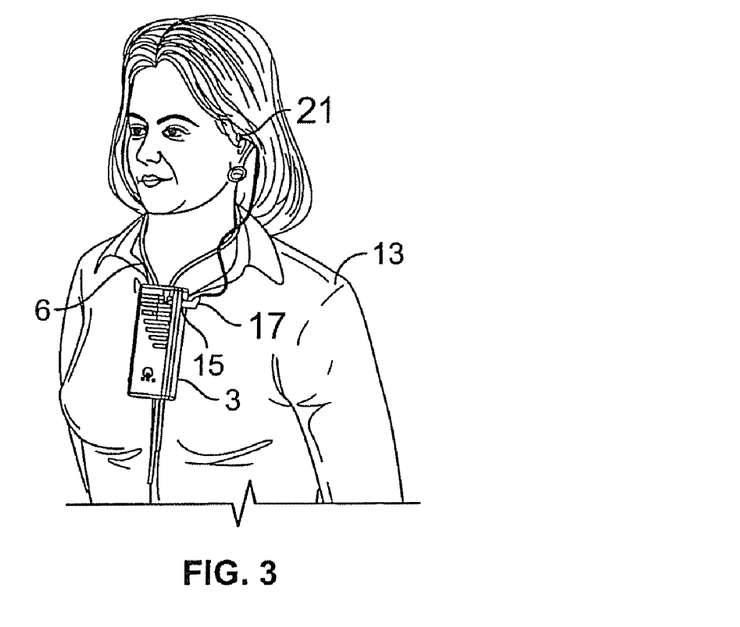
FIG. 3 illustrates a receive unit supported around the neck of a user, in accordance with an embodiment of the present technology.

FIG. 1 illustrates exemplary transmit units 4 and a receive unit 3, in accordance with an embodiment of the present technology. Each of the units includes a lanyard 6 configured for attachment of the unit to a user. FIG. 2 illustrates a transmit unit 4 supported around the neck of a user 12, in accordance with an embodiment of the present technology. The transmit unit 4 can be supported around the neck of the user 12 with the lanyard 6. The lanyard 6 may be adjusted to bring the microphone 45 of unit 4 to within about 4-5 inches of the mouth of user 12. FIG. 3 illustrates a receive unit 3 supported around the neck of a user 13, in accordance with an embodiment of the present technology. The receive unit 3 can be supported around the neck of the user 13 by lanyard 6 at a comfortable location. An earphone unit 21 can be connected to plug 17, which may be plugged into jack 15 on receive unit 3.

In certain embodiments, the units can be reduced in size and can include a clip such that the units are attachable to a user, such as by clipping a unit to a user's shirt collar or placket, for example.

Figure 4A:
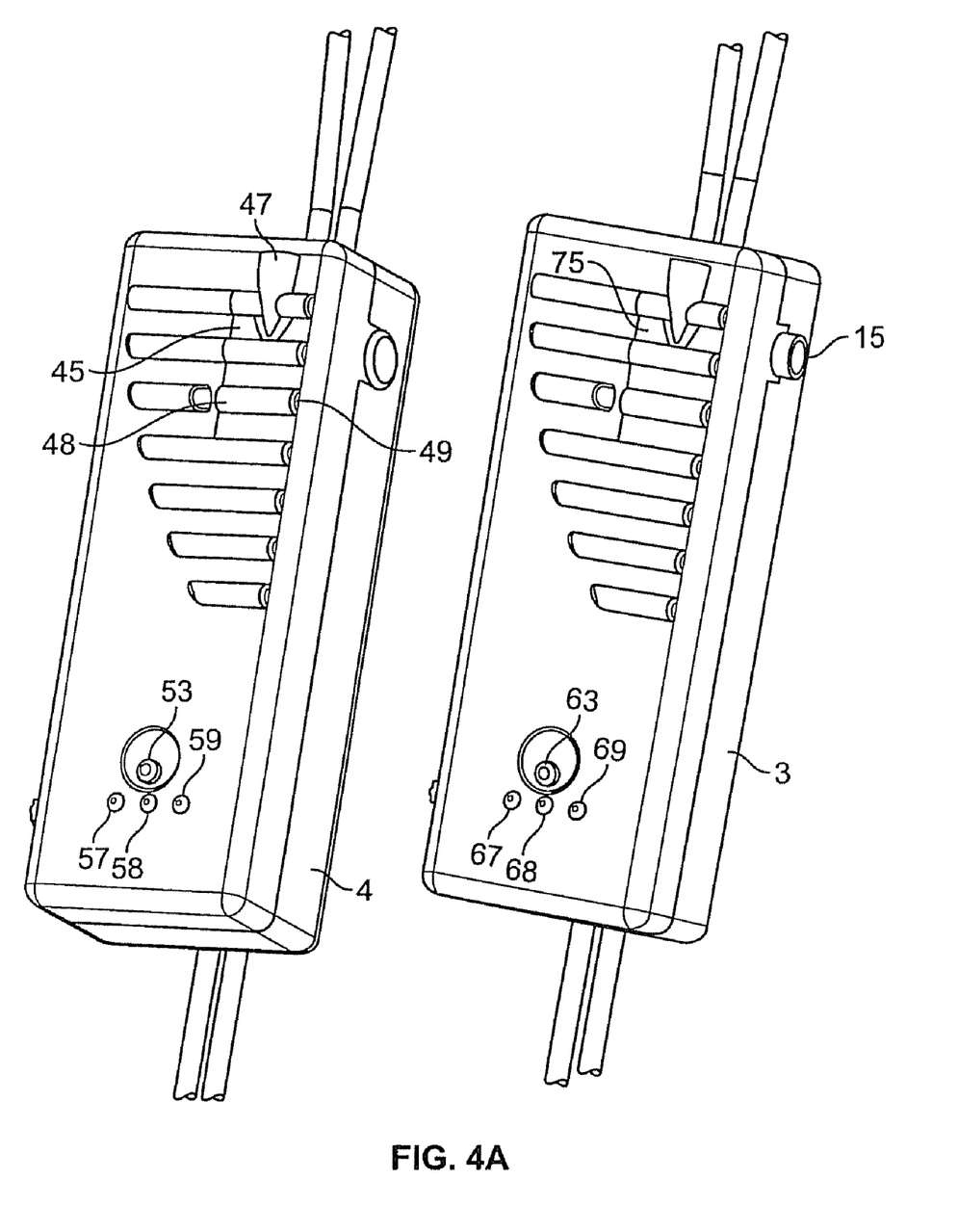
FIG. 4A illustrates exemplary transmit and receive units, in accordance with an embodiment of the present technology.

FIG. 4A illustrates an exemplary transmit unit 4 and an exemplary receive unit 3, in accordance with an embodiment of the present technology. In the embodiment shown, for example, transmit unit 4 includes a directional microphone 45 with front inlet 47 and rear inlets 48 and 49. An on-off switch 53 can activate the unit 4 and lights 57, 58, and 59 can indicate the condition of the communication system. Receive unit 3 can be similar in appearance to transmit unit 4, with microphone 75 allowing the user to monitor their own voice. Receive unit 3 can contain an earphone jack 15 to which an earphone or inductive link can be plugged. An on-off switch 63 may activate the receive unit 3 and lights 67, 68, and 69 may indicate the condition of the communication system.

Figure 4B:
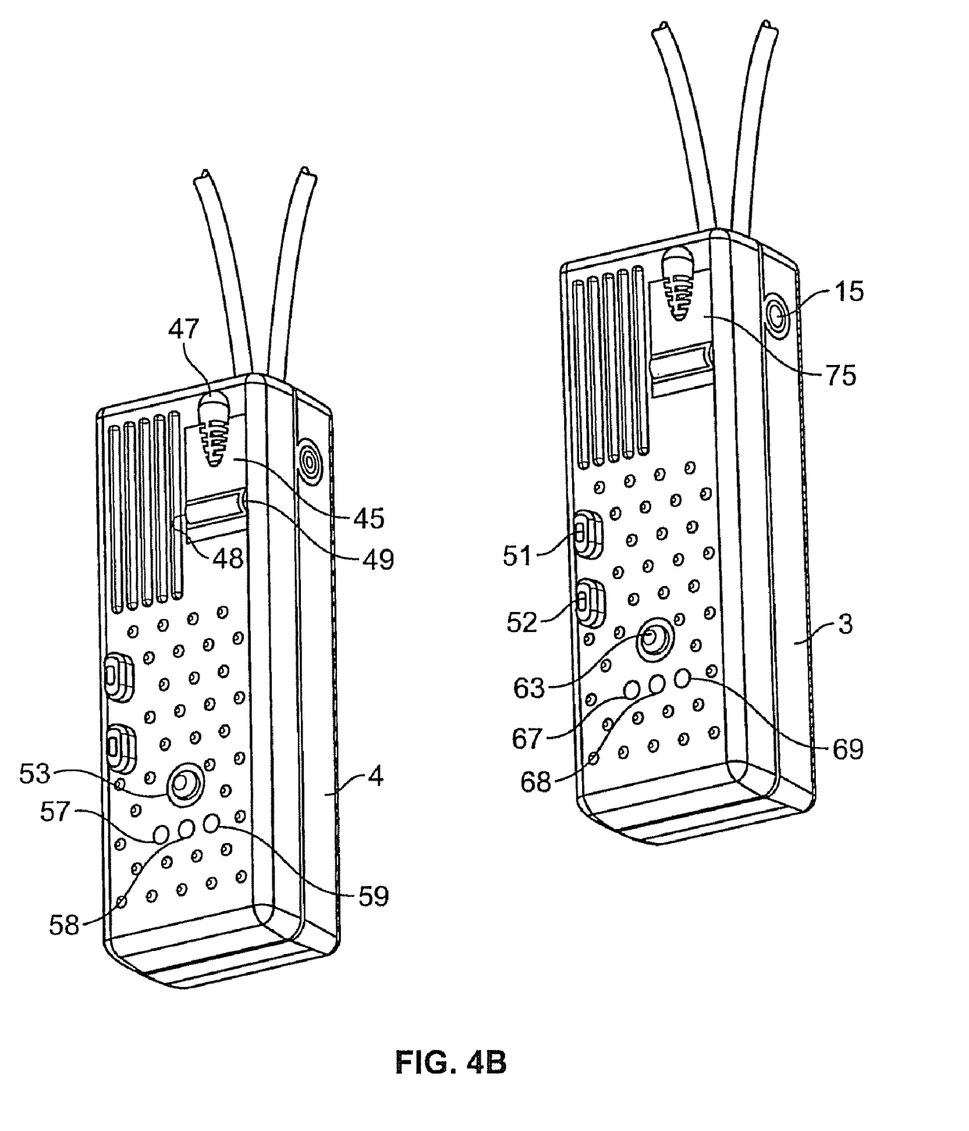
FIG. 4B illustrates exemplary transmit and receive units, in accordance with an embodiment of the present technology.

FIG. 4B illustrates an exemplary transmit unit 4 and an exemplary receive unit 3, in accordance with an embodiment of the present technology. The transmit unit 4 and receive unit 3 are configured like the units discussed in connection with FIG. 4A and the receive unit 3 further includes two momentary contact switches, 51 and 52, configured to adjust the audio output signal amplitude up or down, respectively, to provide volume control.

A transmit/receive unit can be configured to include the elements of transmit unit 4 and receive unit 3 as described above in connection with FIGS. 1-4B.

Figure 5:
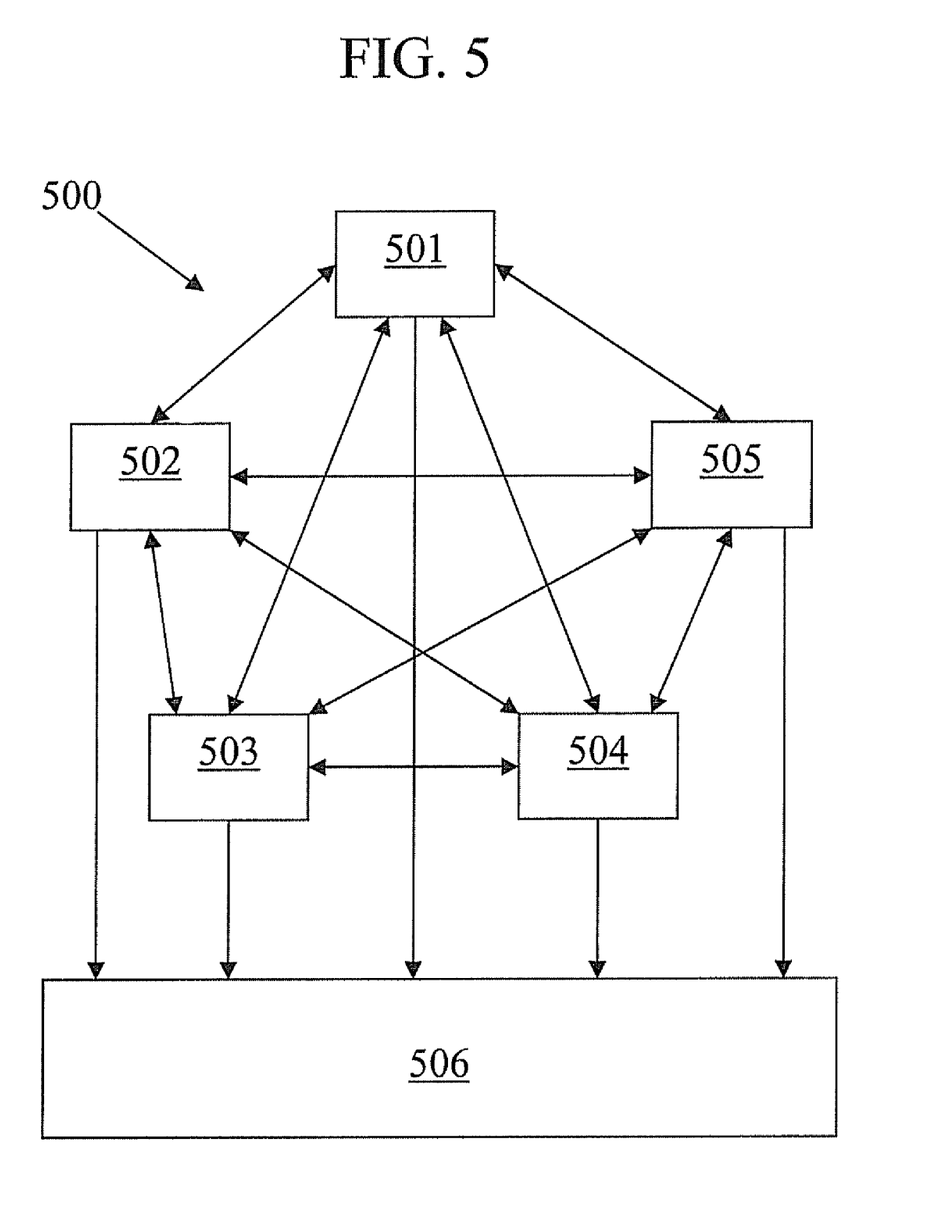
FIG. 5 illustrates a block diagram depicting an exemplary system for wireless communication, in accordance with an embodiment of the present technology.

FIG. 5 illustrates a block diagram depicting an exemplary system 500 for wireless communication, in accordance with an embodiment of the present technology. The system 500 includes five transmit/receive units 501, 502, 503, 504 and 505 and any number of receive units 506. As shown in FIG. 5, for example, each of the transmit/receive units 501-505 can transmit signals to and receive signals from all of the other transmit/receive units 501-505. Also, all of the receive units 506 can receive signals from the transmit/receive units 501-505. In the embodiment shown, there are five transmit/receive units. In certain embodiments, for example, there can be a different number of transmit/receive units, such as three, four, six, or seven, for example.

Figure 6:
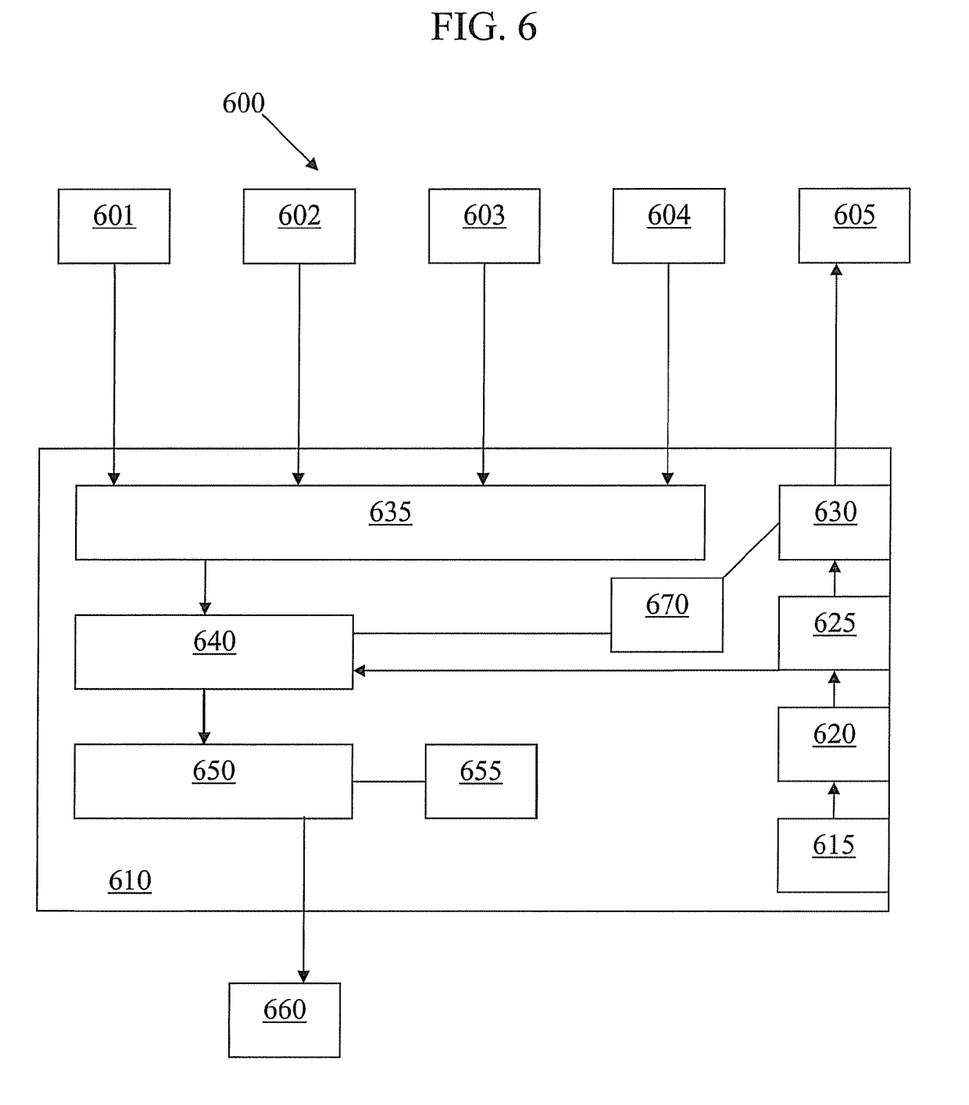
FIG. 6 illustrates a block diagram depicting an exemplary system for wireless communication that includes a transmit/receive unit, in accordance with an embodiment of the present technology.

FIG. 6 illustrates a block diagram depicting an exemplary system 600 for wireless communication that includes a transmit/receive unit 610, in accordance with an embodiment of the present technology. The transmit/receive unit 610 includes a microphone 615 configured to receive sound, circuitry 620 configured to convert the sound into digital audio packets, circuitry 625 configured to compress the digital audio packets, and a transmitter 630 configured to wirelessly transmit the digital audio packets. The transmitter 630 is in communication with a synchronization module 670 configured to indicate the timing of transmissions from the transmitter 630. The transmit/receive unit 610 also includes a receiver 635 configured to receive wireless signals and circuitry 640 configured to sum digital audio packets received wirelessly and digital audio packets created at the unit 610. The circuitry 640 is in communication with the synchronization module 670, which is configured to indicate the timing of transmissions from transmit units. The transmit/receive unit 610 also includes circuitry 650 configured to convert the digital audio packets into sound and/or direct the digital audio packets to a device 660, such as a hearing aid or an earphone, for example, and volume control circuitry 655 configured to allow the audio signal amplitude to be increased or decreased. The transmit/receive unit 610 also includes a power source, such as a battery, for example.

In the embodiment shown in FIG. 6, for example, the transmit/receive unit 610 is configured to transmit digital audio packets in dedicated slot 605, as indicated by the synchronization module 670. Likewise, four other transmit/receive units are configured to transmit digital audio packets in dedicated slots 601, 602, 603 and 604, respectively, as indicated by their respective synchronization modules. The transmit/receive unit 610 can receive the digital audio packets from the other units at receiver 635. Then, using circuitry 640 and transmission timing information from the synchronization module 670, the transmit/receive unit 610 can sum the received digital audio packets with the digital audio packets created at unit 610. The result can be converted into sound and/or directed to a device, such as a hearing aid or an earphone, for example. Likewise, the other four units can perform similar to unit 610 to provide wireless communication among the five units. Also, any number of receive units can be configured to receive transmissions from the transmitting units.

In certain embodiments, for example, the microphone 615 can take a signal from a plurality of microphones, such as two microphones, for example, and digitally manipulate the signals to provide a mono hypercardioid microphone, thereby providing improved noise rejection.

In certain embodiments, for example, a receive only unit can be configured similar to the transmit/receive unit 610, but without a microphone and transmission circuitry. Such a receive only unit would receive transmissions in all five slots 601-605.

In certain embodiments, for example, a group of units can be encoded with a group code that is the same for all units in the group. The group code can determine the pseudo random sequence used by the frequency hopping radio for the group. In certain embodiments, for example, the group code for a first group can be selected such that the pseudo random sequence used by the frequency hopping radio for the first group can be as orthogonal as possible to the pseudo random sequence used by the frequency hopping radio for another group(s), thereby decreasing the likelihood of interference.

In certain embodiments, for example, each unit in a group can be encoded with a function code that indicates whether the unit is configured to: (1) transmit digital audio packets and not receive digital audio packets, (2) receive digital audio packets and not transmit digital audio packets, or (3) transmit and receive digital audio packets.

In certain embodiments, for example, each transmit unit in a group can be encoded with a slot code that indicates the dedicated slot(s) in which the unit transmits. A first unit can transmit in a first slot, a second unit can transmit in a second slot, a third unit can transmit in a third slot, and so on. Each unit can be configured to transmit audio signals in its dedicated slot(s) and receive audio signals transmitted in the remaining slots. Each unit that does not transmit audio signals can be configured to receive audio signals transmitted in all slots.

In certain embodiments, for example, a unit in a group can be configured such that it detects transmit units in the group (e.g., with the same group code) and receives synchronization information (e.g., slot code information) from transmit units such that slot assignments are synchronized among all units in the group.

In certain embodiments, for example, utilizing slot assignments as described herein can allow for transmit units in a group to be powered on in any order, such that certain units do not need to be powered on first and/or in any specific order. In other embodiments, for example, a specific transmit unit must be powered on first in order to synchronize transmission/reception among the group. In such embodiments, one unit is the master unit, and that unit must be powered on for the system to work. When the master unit is powered on, it begins transmitting data packets in a dedicated slot, such as slot 1, for example. Each data packet can include a primary and secondary address field that includes: a data pattern with numeric properties that is assigned to the group of units; a number that corresponds to a unique frequency hopping pattern; and a number that indicates the slot in which the data packet was transmitted. When remaining (non-master) units are powered on, they can look at local memory (e.g., electrically erasable programmable read-only memory (EEPROM), such as flash, for example, or electrically erasable read-only memory (EEROM), for example) and locate the hopping algorithm for the group and the slot number for that specific unit. In certain embodiments, a synchronization module, such as the one described in connection with FIG. 6, for example, can provide such information. Each unit can listen at the specified frequency. When a unit decodes a packet from another unit in the group, it can look at the slot number of the packet and start timing based on the hop algorithm, frequency, and slot number of the received packet. Every time a non-master unit listens for the master unit's dedicated slot (e.g., at 20 microseconds before the master is supposed to transmit), the non-master unit can adjust its clock to match the actual timing of the transmission from the master. For example, a non-master unit can adjust its clock if the master unit's dedicated slot begins before or after 20 microseconds from when the non-master unit started listening. This can prevent drift that may result from each units' timing crystal being different.

Figure 7:
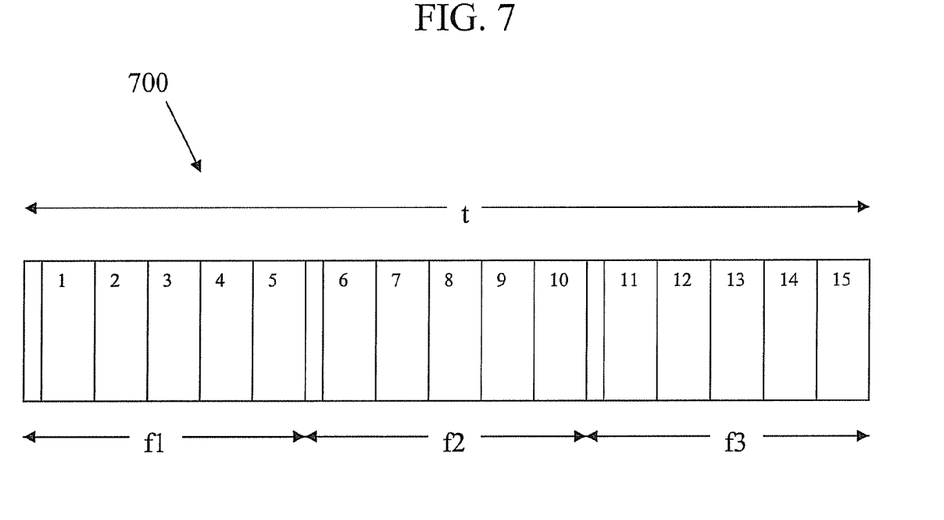
FIG. 7 illustrates a block diagram of an exemplary transmission cycle, in accordance with an embodiment of the present technology.

FIG. 7 illustrates a block diagram of an exemplary transmission cycle 700, in accordance with an embodiment of the present technology. In the embodiment shown in FIG. 7, for example, five units can each transmit in three dedicated slots over the time period t, thereby sending the same data in frames, f1, f2 and f3, such that three sets of the same data are sent. In such an embodiment, a first unit can transmit in the first, sixth and eleventh slots, a second unit can transmit in the second, seventh and twelfth slots, a third unit can transmit in the third, eighth and thirteenth slots, a fourth unit can transmit in the fourth, ninth and fourteenth slots, and a fifth unit can transmit in the fifth, tenth and fifteenth slots.

In certain embodiments, for example, each frame (f1, f2 and f3) can be about 1.25 milliseconds long, such that the time period t can be about 3.75 milliseconds or less. Each frame can include a frequency settling window of about 130 microseconds (+20 microseconds to compensate for timing variation), which can allow each receive unit time for its local oscillator to adjust frequency. Each frame can also include five 165 microsecond slots (+20 microseconds to compensate for timing variation), wherein each slot is dedicated to transmitting audio from a specified transmitter unit. Each slot can transmit the following bits at 2 megahertz: 8 bit preamble, 40 bit address, 9 bits of control, 16 bits of address/control (additional), 240 bits of data (e.g., 60 4-bit samples of 16 kilohertz sampled adaptive differential pulse-code modulation (ADPCM) data packets), 16 bits of cyclic redundancy code (CRC) and a 35 microsecond guardband. In such embodiments, latency, which is the length of time between receiving an audio input at a transmit unit and outputting the audio output at a receive unit can be about 8 milliseconds or less. Experimental results indicate that a latency of about 60-80 milliseconds will result in a discernable echo. At about 30 milliseconds latency, the echo is much less noticeable. Under 20 milliseconds latency, the echo effect will likely go unnoticed. However, systems that have achieved reduced latency have often experienced increased audio defects. Audio defects are also undesirable.

FIG. 7 depicts an exemplary transmission cycle 700. Nonetheless, other transmission cycles can be adopted without departing from the scope of the present technology. For example, in certain embodiments, redundant transmission in six slots may be achieved. Other transmission cycles would also be evident to one skilled in the art in light of the present application.

In certain embodiments of the present technology, for example, transmitting multiple sets of the same data can provide for fewer audio defects. For example, due to the properties of the pseudo random sequence used by the frequency hopping radio for a group, it is likely that a first set of the data will be transmitted in a different part of the spectrum than a second set of the data, and/or a third set of the data, for example. Therefore, if the first set of the data is lost, it is less likely that the second set of the data and/or the third set of the data will also be lost.

In certain embodiments, for example, receive units can include power management functions. For example, in an embodiment where a digital audio packet is redundantly transmitted three times in three dedicated slots, a receive unit can listen for the digital audio packet in the first dedicated slot. If the digital audio packet is received, the receive unit can conserve power by not listening during the second and third dedicated slot, when the same digital audio packet would be received. Likewise, if the digital audio packet is not received in the first dedicated slot, but is received in the second dedicated slot, the receive unit can conserve power by not listening during the third dedicated slot, when the same digital audio packet would be received. As another example, each transmission frame, e.g., frames f1, f2 and f3 shown in FIG. 7, can include dead time at the beginning of each frame, during which power can be conserved. As another example, receive units can listen infrequently, or not at all, during dedicated slots for transmit units that are not powered on, or have not transmitted for a certain period of time. In certain embodiments, power management functions, such as those described above, for example, can provide for extended battery life.

In certain embodiments, for example, when all transmitted data sets are lost, pops and clicks can be minimized by: (1) ramping the output of the receive unit down to zero by the end of the transmission period; and (2) ramping the output of the receive unit back up during the beginning of the next successfully received data set.

Experimental testing of an embodiment that included five transmit/receive units, each unit transmitting redundantly in three dedicated slots every 3.75 milliseconds resulted in about one audio defect per hour. In the experimental embodiment, for example, the microphone signal was converted into sub banded ADPCM data packets. The packets were compressed from 16 bits to 4 bits using a G.722 coder. The data transmission rate was 2 Mhz, and each frame was comprised as described above in connection with FIG. 7. Using sub banded ADPCM data packets provided some loss of data when compared to PCM data packets, however, experimental testing indicated that the loss did not result in lowered intelligibility. The experimental embodiment provided acceptable latency, which was about 8 milliseconds.

In the experimental embodiment, for example, the units had the following dimensions: 1.75 inches long by 0.90 inches wide by 0.50 inches deep. The units included a front cover with an integral antenna and indicator light, a rear cover, a printed circuit board assembly with a 3.5 mm stereo jack, two microphone gaskets, a rechargeable lithium polymer battery with a battery life between about 6 and 10 hours, and push button switch covers in communication with power and volume switches on the printed circuit board assembly (PCBA). The PCBA also included the ST Micro STM32F101Rx processor with flash memory, the TI BQ25012 DC/DC converter with lithium polymer charger, the Wolfson WM8750 codec, the 2.4 GHz Nordic Semiconductor nRF24L01 transceiver, a RF power amp, a light-emitting diode configured to indicate when charging is in progress, a light-emitting diode configured to indicate when the unit is in use, and two SMD microphones configured to be used as a directional microphone. In certain embodiments, for example, the ST Micro processor, the DC/DC converter and the codec can be replaced with the NXP LPC2880.

In another experimental embodiment, the components described below can be used to implement a transmit/receive unit with elements similar to those described above in connection with FIG. 6. Other miscellaneous components can be used to replace or connect the components described below, as will be evident to one skilled in the art. An NXP LPC2888 can be used to implement some or all of the functions of: (1) the circuitry 620 configured to convert the sound into digital audio packets; (2) the circuitry 625 configured to compress the digital audio packets; (3) the synchronization module 670 configured to indicate the timing of transmissions from transmit units; (4) the circuitry 640 configured to sum digital audio packets received wirelessly and digital audio packets created at the unit; (5) the circuitry 650 configured to convert the digital audio packets into sound and/or direct the digital audio packets to a device; and volume control circuitry 655 configured to allow the audio signal amplitude to be increased or decreased. A Nordic 24L01+ can be used to implement some or all of the functions of: (1) the transmitter 630 and (2) the receiver 635. Other components can include a Lithium Polymer battery, a TI BQ24010 to implement battery charging, a printed antenna, and a TI CC2590 which can provide for longer range transmission and reception in a smaller unit.

Figure 8:
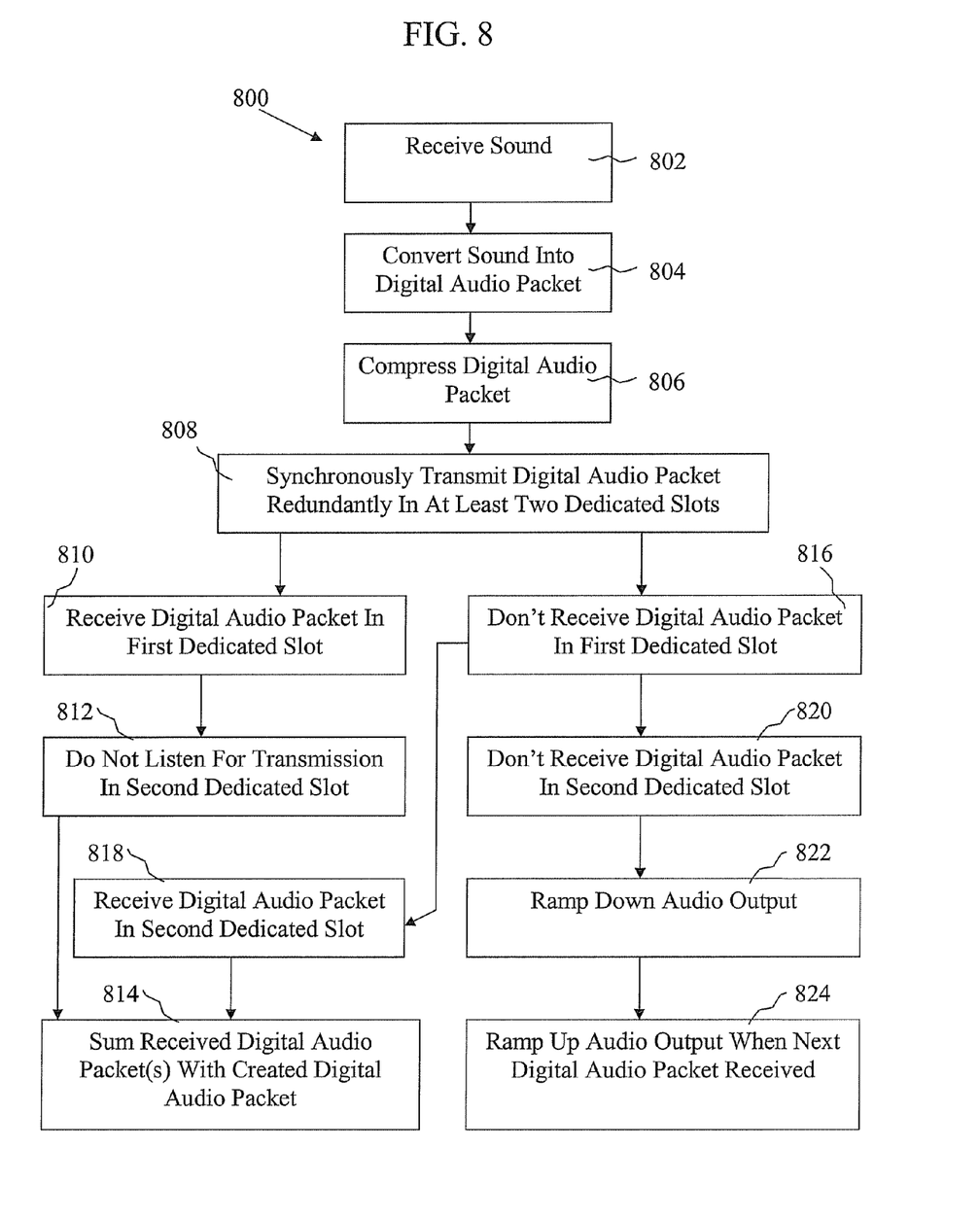
FIG. 8 illustrates a flow diagram of an exemplary method, in accordance with an embodiment of the present technology.

FIG. 8 illustrates a flow diagram of an exemplary method 800, in accordance with an embodiment of the present technology. In certain embodiments, for example, a group of units configured as described above can be used in connection with such a method and/or a method that includes some or all of the steps shown and described in connection with FIG. 8 to wirelessly transmit and receive data.

At 802, sound is received. In certain embodiments, for example, a transmit unit can receive an audio signal(s) from a microphone.

At 804, sound is converted into a digital audio packet. In certain embodiments, for example, the sound received by the microphone(s) can be converted into a sub banded adaptive differential pulse-code modulation data packet.

At 806, the digital audio packet is compressed. In certain embodiments, for example, the packet can be compressed from 16 bit to 4 bit using an available coder.

At 808, the digital audio packet is synchronously transmitted redundantly in at least two dedicated slots. In certain embodiments, for example, the packet can be transmitted redundantly in two dedicated slots over a 6 millisecond period.

At 810, the digital audio packet is received in the first dedicated slot. In certain embodiments, for example, a receive unit can receive data from a transmit unit that was transmitted in the first dedicated slot.

At 812, if the packet is received in the first dedicated slot, the receive unit does not listen for a transmission in the second dedicated slot. In certain embodiments, for example, this can provide for reduced power consumption for the receive unit.

At 816, if the packet is not received in the first dedicated slot, the receive unit listens for the transmission in the second dedicated slot. In certain embodiments, for example, this can provide for a reduction of audio defects.

At 818, the digital audio packet is received in the second dedicated slot. In certain embodiments, for example, a receive unit can receive data from a transmit unit that was transmitted in the second dedicated slot.

At 820, the packet is not received in the second dedicated slot. In certain embodiments, for example, the receive unit would listen for the transmission in the third dedicated slot, and so on. However, if there are no further transmissions of the audio packet, an audio defect may occur.

At 822, audio output is ramped down. In certain embodiments, for example, the audio output of a receive unit is ramped down if reception of wireless transmissions is interrupted, such as when all transmissions of a digital audio packet are not received.

At 822, audio output is ramped up when a next digital audio packet is received. In certain embodiments, for example, the audio output of a receive unit is ramped up if wireless transmissions are received after an interruption, such as when a next digital audio packet is received after a previous digital audio packet was not received.

At 814, received digital audio packet(s) are summed with digital audio packets created at the transmit/receive unit. In certain embodiments, for example, the transmit/receive unit can receive data from multiple transmit units and sum the received packets with a digital audio packet created at the transmit/receive unit.

Once the digital audio packets are summed, they can be converted to sound and output at the receive unit, for example, via a hearing aid or an earphone.

In operation, utilizing a method 800 such as that described in connection with FIG. 8 in accordance with embodiments of the present technology can lower the incidence of audio defects, for example, by providing redundancy in wireless transmission of audio signals and can provide for reduced latency.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A wireless communication system comprising:
   a first unit configured to synchronously transmit a first digital audio packet redundantly in at least a first dedicated slot of a plurality of dedicated slots of a first frame and a second dedicated slot of a plurality of dedicated slots of a second frame over a time period;
   a second unit configured to synchronously transmit a second digital audio packet redundantly in at last a third dedicated slot of the plurality of dedicated slots of the first frame and a fourth dedicated slot of the plurality of dedicated slots of the second frame over the time period; and
   a third unit configured to receive wireless transmissions from the first unit and the second unit.

2. The system of claim 1, wherein the third unit is configured to not listen for a transmission in the second dedicated slot if the first digital audio packet is received in the first dedicated slot.

3. The system of claim 1, wherein the third unit is configured to synchronously transmit a third digital audio packet redundantly in at least a fifth dedicated slot of the plurality of dedicated slots of the first frame and a sixth dedicated slot of the plurality of dedicated slots of the second frame over the time period, and wherein the first unit and the second unit are configured to receive wireless transmissions from the third unit.

4. The system of claim 3, wherein the first, second and third units are configured to synchronize transmissions and receptions based on the order in which the units are powered on.

5. The system of claim 3, wherein the first, second and third units are configured to synchronize transmissions and receptions independent of the order in which the units are powered on.

6. The system of claim 1, further comprising a fourth unit configured to receive wireless transmissions from the first unit and the second unit.

7. The system of claim 1, further comprising a fourth unit configured to synchronously transmit a third digital audio packet redundantly in at least a fifth dedicated slot of the plurality of dedicated slots of the first frame and a sixth dedicated slot of the plurality of dedicated slots of the second frame over the time period, wherein the third unit is configured to receive wireless transmissions from the fourth unit.

8. The system of claim 1, wherein the first unit is configured to convert an audio input into the first digital audio packet and the third unit is configured to convert the first digital audio packet into an audio output.

9. The system of claim 8, wherein a length of time between receiving the audio input at the first unit and outputting the audio output at the third unit is about 20 milliseconds or less.

10. The system of claim 8, wherein the first digital audio packet is compressed prior to transmission, and wherein the first digital audio packet is reduced from 16 bit to 4 bit.

11. The system of claim 8, wherein the third unit is configured to ramp down a volume of the audio output if reception of the first digital audio packet is interfered with and then ramp up the volume of the audio output if a next digital audio packet is received.

12. The system of claim 1, wherein the first unit is configured to convert an audio input into the first digital audio packet using sub banded adaptive differential pulse-code modulation.

13. The system of claim 1, wherein the first unit is configured to convert an audio input received by a plurality of directional microphones into the first digital audio packet.

14. The system of claim 1, wherein the first unit is configured to redundantly transmit the first data packet in three dedicated slots over the time period of about 8 milliseconds or less, wherein each of the three dedicated slots is associated with a different frame.

15. The system of claim 1, wherein the first unit, the second unit and the third unit are encoded with a group code that identifies group members, and wherein the third unit is configured to only receive data packets transmitted by group members with the same group code.

16. The system of claim 15, wherein the group code determines a pseudo random sequence to be used by a frequency hopping radio transmitter of the first unit.

17. A method for wireless communication comprising:
   synchronously transmitting a first digital audio packet redundantly from a first unit in at least a first dedicated slot of a plurality of dedicated slots of a first frame and a second dedicated slot of a plurality of dedicated slots of a second frame over a time period;
   synchronously transmitting a second digital audio packet redundantly from a second unit in at least a third dedicated slot of the plurality of dedicated slots of the first frame and a fourth dedicated slot of the plurality of dedicated slots of the second frame over the time period; and receiving a wireless transmission from the first unit and the second unit at a third unit.

18. The method of claim 17, wherein the third unit is configured to not listen for a transmission in the second dedicated slot if the first digital audio packet is received in the first dedicated slot.

19. The method of claim 17, further comprising:
synchronously transmitting a third digital audio packet redundantly from the third unit in at least a fifth dedicated slot of the plurality of dedicated slots of the first frame and a sixth dedicated slot of the plurality of dedicated slots of the second frame over the time period; and
receiving a wireless transmission from the third unit at the first unit and the second unit.

20. The method of claim 17, further comprising:
synchronously transmitting a third digital audio packet redundantly from a fourth unit in at least a fifth dedicated slot of the plurality of dedicated slots of the first frame and a sixth dedicated slot of the plurality of dedicated slots of the second frame over the time period; and
receiving a wireless transmission from the fourth unit at the third unit.

21. The method of claim 17, further comprising
converting an audio input at the first unit into the first digital audio packet;
converting the first digital audio packet into an audio output at the third unit.

22. The method of claim 21, wherein a length of time between receiving the audio input at the first unit and outputting the audio output at the third unit is about 20 milliseconds or less.

23. The method of claim 17, further comprising:
converting at least one audio signal at the first unit into the first digital audio packet using sub banded adaptive differential pulse-code modulation.

24. The method of claim 17, wherein the first unit is configured to redundantly transmit the first data packet in three dedicated slots over the time period of about 8 milliseconds or less, wherein each of the three dedicated slots is associated with a different frame.

25. The method of claim 17, wherein the first unit, the second unit and the third unit are encoded with a group code that identifies group members, and wherein the third unit is configured to only receive data packets transmitted by group members with the same group code.

* * * * *